(12) United States Patent
Chimmalgi et al.

(10) Patent No.: US 10,244,613 B2
(45) Date of Patent: Mar. 26, 2019

(54) SYSTEM AND METHOD FOR ELECTRODELESS PLASMA IGNITION IN LASER-SUSTAINED PLASMA LIGHT SOURCE

(71) Applicant: KLA-Tencor Corporation, Milpitas, CA (US)

(72) Inventors: Anant Chimmalgi, San Jose, CA (US); Rudolf Brunner, Mountain View, CA (US); Anatoly Shchemelinin, Bozeman, MT (US); Ilya Bezel, Mountain View, CA (US); Erik Kim, Sunnyvale, CA (US); Rajeev Patil, Fremont, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 0 days.

(21) Appl. No.: 15/280,073

(22) Filed: Sep. 29, 2016

(65) Prior Publication Data

US 2017/0150590 A1 May 25, 2017

Related U.S. Application Data (60) Provisional application No. 62/236,904, filed on Oct. 4, 2015.

(51) Int. Cl.
*A61N 5/06* (2006.01)
*H05G 2/00* (2006.01)
(Continued)

(52) U.S. Cl.
CPC ........... *H05G 2/008* (2013.01); *G02B 6/4204* (2013.01); *H01J 61/025* (2013.01); *H01J 61/54* (2013.01);
(Continued)

(58) Field of Classification Search
CPC .......... H05G 2/00; H05G 2/001; H05G 2/003; H05G 2/005; H05G 2/006; H05G 2/008
(Continued)

(56) References Cited

U.S. PATENT DOCUMENTS

| 7,705,331 | B1 | 4/2010 | Kirk et al. |
| 7,872,794 | B1 * | 1/2011 | Minelly ............. H01S 3/06758 359/337.13 |

(Continued)

FOREIGN PATENT DOCUMENTS

WO 2015148671 A1 10/2015

OTHER PUBLICATIONS

International Search Report for International Application No. PCT/US2016/054733 dated Jan. 4, 2017, 6 pages.
(Continued)

*Primary Examiner* — Jason L McCormack
(74) *Attorney, Agent, or Firm* — Suiter Swantz pc llo (57) ABSTRACT

An illumination source for igniting and sustaining a plasma in a plasma lamp of a laser-sustained plasma (LSP) broadband source includes one or more ignition lasers configured to ignite the plasma within a gas contained within the plasma lamp. The illumination sources also include one or more sustaining lasers configured to sustain the plasma. The illumination sources include a delivery optical fiber, one or more optical elements configured to selectively optically couple an output of the one or more ignition lasers, and an output of the one or more sustaining lasers to the delivery optical fiber.

34 Claims, 9 Drawing Sheets

(51) Int. Cl.
  *H01J 65/04* (2006.01)
  *G02B 6/42* (2006.01)
  *H01J 61/02* (2006.01)
  *H01J 61/54* (2006.01)
(52) U.S. Cl.
  CPC ............ *H01J 65/04* (2013.01); *H01J 65/042* (2013.01); *H05G 2/003* (2013.01)
(58) Field of Classification Search
  USPC ..................................................... 250/504 R
  See application file for complete search history.

(56) References Cited

U.S. PATENT DOCUMENTS

| | | | |
|---|---|---|---|
| 8,148,900 B1 | 4/2012 | Kirk et al. | |
| 8,216,773 B1 | 7/2012 | Delgado | |
| 8,575,576 B2 | 11/2013 | Solarz et al. | |
| 9,048,000 B2 | 6/2015 | Smith | |
| 9,099,292 B1 | 8/2015 | Bezel et al. | |
| 2002/0153500 A1* | 10/2002 | Fordahl ................ | B23K 26/048 250/559.29 |
| 2004/0118834 A1 | 6/2004 | Ohmi et al. | |
| 2007/0001131 A1* | 1/2007 | Ershov ................... | H05G 2/003 250/503.1 |
| 2007/0164680 A1 | 7/2007 | Kumar et al. | |
| 2011/0181191 A1* | 7/2011 | Smith .................... | B82Y 10/00 315/149 |
| 2012/0255935 A1* | 10/2012 | Kakui ................ | B23K 26/0869 219/121.6 |
| 2013/0106275 A1* | 5/2013 | Chimmalgi ........... | H01J 61/526 313/39 |
| 2014/0240951 A1 | 8/2014 | Brady et al. | |
| 2015/0034844 A1* | 2/2015 | Shu ...................... | G03F 7/70916 250/504 R |
| 2015/0048741 A1 | 2/2015 | Shortt et al. | |
| 2015/0085516 A1 | 3/2015 | Brune et al. | |
| 2015/0168847 A1 | 6/2015 | Solarz et al. | |

OTHER PUBLICATIONS

Frank, J.D. et al., "High voltage ignition of high pressure microwave powered UV light sources", IEEE, May 19-22, 1997, Abstract.

* cited by examiner

SYSTEM AND METHOD FOR ELECTRODELESS PLASMA IGNITION IN LASER-SUSTAINED PLASMA LIGHT SOURCE

CROSS-REFERENCE TO RELATED APPLICATION

The present application claims priority under 35 U.S.C. § 119(e) to U.S. Provisional Patent Application Ser. No. 62/236,904 entitled NOVEL LAMP IGNITION SCHEME AND LAMP DESIGN FOR LASER PUMPED LAMPS USED ON BRIGHTFIELD WAFER INSPECTION TOOLS, filed Oct. 4, 2015, naming Anant Chimmalgi, Rudolf Brunner, Anatoly Shchemelinin, Ilya Bezel, Erik Kim and Rajeev Patil as inventors, which is incorporated herein by reference in the entirety.

TECHNICAL FIELD

The present invention generally relates to plasma-based light sources, and, more particularly, to an electrodeless plasma-based light source.

BACKGROUND

The need for improved illumination sources used for inspection of ever-shrinking semiconductor devices continues to grow. One such illumination source includes a laser-sustained plasma source. Laser-sustained plasma (LSP) light sources are capable of producing high-power broadband light. Laser-sustained light sources operate by focusing laser radiation into a gas volume in order to excite the gas, such as argon or xenon, into a plasma state, which is capable of emitting light. This effect is typically referred to as "pumping" the plasma. Typically, plasma lamps require electrodes to ignite the plasma, which is then sustained solely by laser energy. The need for electrodes also necessitates complicated glass metal sealing technologies and a complex bulb form factor that makes it prone to stress concentration, failure at the metal glass seal and an overall reduction of burst pressure/strength of the lamp. The electrodes themselves are also prone to degradation/sputtering, which reduces the glass transmission due to darkening. Therefore, it would be desirable to provide a system and method that cures the shortcomings of previous approaches such as those of the identified above.

SUMMARY

An illumination source for electrodeless ignition of a plasma in broadband plasma source is disclosed, in accordance with one or more embodiments of the present disclosure. In one embodiment, the illumination source includes one or more ignition lasers configured to ignite a plasma within a gas contained within a plasma lamp. In another embodiment, the illumination source includes one or more sustaining lasers configured to sustain the plasma. In another embodiment, the illumination source includes a delivery optical fiber. In another embodiment, the illumination source includes one or more optical elements configured to selectively optically couple an output of the one or more ignition lasers and an output of the one or more sustaining lasers to the delivery optical fiber. In another embodiment, the illumination source is integrated within a broadband laser-sustained plasma (LSP) source, whereby one or more lamp optics direct an output from the delivery optical fiber to the volume of gas within the plasma lamp to ignite and sustain the plasma within the volume of gas in the plasma lamp.

An illumination source for electrodeless ignition of a plasma in broadband plasma source is disclosed, in accordance with one or more additional embodiments of the present disclosure. In one embodiment, the illumination source includes one or more ignition lasers configured to ignite a plasma within a gas contained within a plasma lamp. In another embodiment, the illumination source includes one or more sustaining lasers configured to sustain the plasma. In another embodiment, the illumination source includes a delivery optical fiber, wherein an output of the one or more sustaining lasers is coupled to an input of the delivery fiber. In another embodiment, the illumination source includes a process optical fiber. In another embodiment, the illumination source includes a fiber coupler optically coupled to an output of the delivery optical fiber and an input of the process optical fiber. In another embodiment, the fiber coupler includes one or more optical elements configured to selectively optically couple an output of the one or more ignition lasers and an output of the one or more sustaining lasers to an input of the process optical fiber. In another embodiment, the illumination source is integrated within a broadband laser-sustained plasma (LSP) source, whereby one or more lamp optics direct an output from the process optical fiber to the volume of gas within the plasma lamp to ignite and sustain the plasma within the volume of gas in the plasma lamp.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the disclosure may be better understood by those skilled in the art by reference to the accompanying figures in which.

DETAILED DESCRIPTION OF THE INVENTION

Reference will now be made in detail to the subject matter disclosed, which is illustrated in the accompanying drawings. Although particular embodiments of this invention have been illustrated, it is apparent that various modifications and embodiments of the invention may be made by those skilled in the art without departing from the scope and spirit of the foregoing disclosure. Accordingly, the scope of the invention should be limited only by the claims appended hereto.

Referring generally to FIGS. 1A through 2C, a system for igniting and sustaining a plasma in a broadband light source is described in accordance with the present disclosure. Embodiments of the present disclosure are directed to an electrodeless plasma lamp for use in a LSP broadband source. Additional embodiments of the present disclosure are directed to simplified plasma lamp geometries and configurations. Such embodiments improve plasma lamp reliability, lifetime (by preventing problems caused by electrode degradation), and scalability. Additional embodiments of the present disclosure are directed to plasma ignition schemes involving one or more ignition lasers coupled in-line with one or more sustaining lasers. In these embodiments, the one or more ignition lasers may ignite a plasma within a given plasma lamp, and, then, following plasma ignition, the one or more sustaining lasers may sustain the plasma.

Figure 1A:
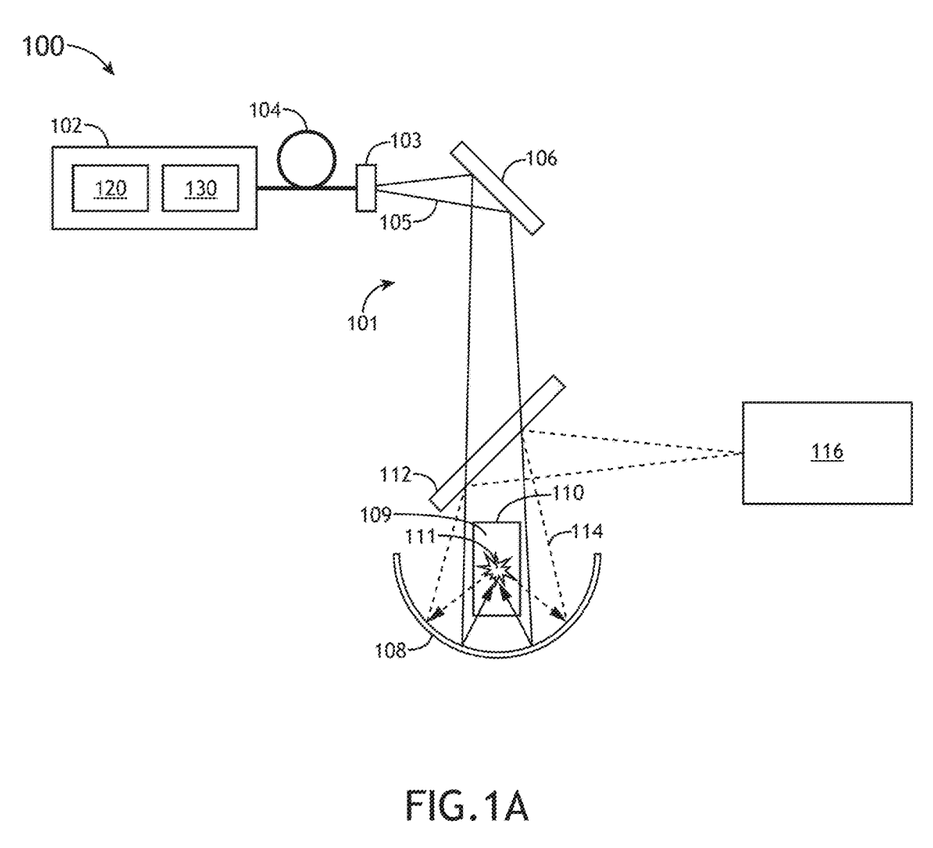
FIG. 1A illustrates a simplified schematic view of a system for forming a light-sustained plasma, in accordance with one or more embodiments of the present disclosure.

FIG. 1A illustrates a system 100 for forming a light-sustained plasma (LSP), in accordance with embodiment of the present invention. The system 100 may serve as a broadband radiation source for any number of applications, such as, but not limited to, an inspection tool or a metrology tool.

The generation of a light-sustained plasma is generally described in U.S. Pat. No. 7,435,982, issued on Oct. 14, 2008, which is incorporated by reference herein in the entirety. The generation of plasma is also generally described in U.S. Pat. No. 7,786,455, issued on Aug. 31, 2010, which is incorporated by reference herein in the entirety. The generation of plasma is also generally described in U.S. Pat. No. 7,989,786, issued on Aug. 2, 2011, which is incorporated by reference herein in the entirety. The generation of plasma is also generally described in U.S. Pat. No. 8,182,127, issued on May 22, 2012, which is incorporated by reference herein in the entirety. The generation of plasma is also generally described in U.S. Pat. No. 8,309,943, issued on Nov. 13, 2012, which is incorporated by reference herein in the entirety. The generation of plasma is also generally described in U.S. Pat. No. 8,525,138, issued on Feb. 9, 2013, which is incorporated by reference herein in the entirety. The generation of plasma is also generally described in U.S. Pat. No. 8,921,814, issued on Dec. 30, 2014, which is incorporated by reference herein in the entirety. The generation of plasma is also generally described in U.S. Pat. No. 9,318,311, issued on Apr. 19, 2016, which is incorporated by reference herein in the entirety. The generation of plasma is also generally described in U.S. Patent Publication No. 2014/0291546, filed on Mar. 25, 2014, which is incorporated by reference herein in the entirety. Transverse pumping of a light-sustained plasma is generally described in U.S. Patent Publication No. 2015/0282288, filed on Mar. 31, 2015, which is incorporated by reference herein in the entirety. In a general sense, the various embodiments of the present disclosure should be interpreted to extend to any plasma-based light source known in the art. An optical system used in the context of plasma generation is described generally in U.S. Pat. No. 7,705,331, issued on Apr. 27, 2010, which is incorporated herein by reference in the entirety.

In one embodiment, the system 100 includes a plasma lamp 110. In another embodiment, the system 100 includes an illumination source 102 configured to ignite and/or sustain a plasma 111 within the plasma lamp 110. The illumination source 102 may emit light of any selected wavelength, or wavelength range, such as, but not limited to, infrared radiation, visible and/or UV radiation. In one embodiment, the illumination source 102 includes one or more sustaining lasers 120 and one or more ignition lasers 130. The one or more ignition lasers 130 may ignite plasma 111 within the plasma lamp 110. Then, once the plasma 111 is ignited, the one or more sustaining lasers 120 serve to sustain the plasma 111 within the plasma lamp 110.

In another embodiment, the system 100 includes one or more optical fibers (e.g., delivery fiber and/or process fiber) for delivering illumination (e.g., ignition illumination and/or sustaining illumination) from the illumination source 102 to the illumination path 101 of the system 100.

In another embodiment, the system includes one or more lamp optics. For example, as shown in FIG. 1A, the one or more lamp optics may include, but are not limited to, a collector element 108 (e.g., ellipsoidal mirror, parabolic mirror or spherical mirror) for directing and/or focusing illumination 105 from the illumination source 102 (via the optical fiber 104) into the volume of gas 109 contained within the plasma lamp 110 to ignite and/or sustain the plasma 111. Further, the collector element 108 may also collect broadband radiation 114 emitted by the generated plasma 111 and direct the broadband radiation 114 to one or more additional optical elements 116.

In an alternative and/or additional embodiment, the one or more lamp optics may include a set of illumination optics for directing and/or focusing illumination 105 from the illumination source 102 (via optical fiber 104) into the volume of gas contained within the plasma lamp 110 to ignite and/or sustain the plasma 111. For example, the set of illumination optics may include a set of reflector elements (e.g., mirrors) configured to direct an output from the process optical fiber 104 to the volume of gas within the plasma lamp 110 to ignite and/or sustain the plasma 111. In addition, the one or more lamp optics may include, but are not limited to, a set of collection elements (e.g., mirrors) for collecting broadband radiation 114 emitted by the plasma 111 and directing the broadband radiation 114 to one or more additional optical elements 116. The use of separate illumination and collection optics in a plasma source is described generally in U.S. patent application Ser. No. 15/187,590, filed on Jun. 20, 2016, which is incorporated herein.

It is noted that the optical configuration used to deliver sustaining illumination from the one or more sustaining lasers 120 and ignition illumination from the one or more ignition lasers 130 of the laser source 102 to the plasma 111 may include any optical configuration capable of sequentially or simultaneously delivering sustaining and ignition illumination to the plasma 111 (or gas). For example, the optical configuration used to couple illumination from the one or more sustaining laser 120 and the one or more ignition lasers to the optical fiber 104 may include reflective and/or transmissive optics 103. Further, the optical configuration may include one or more blocking mirrors, one or more adjustable/flip mirrors, one or more dichroic mirrors, one or more polarizing combiners and the like.

Figure 1B:
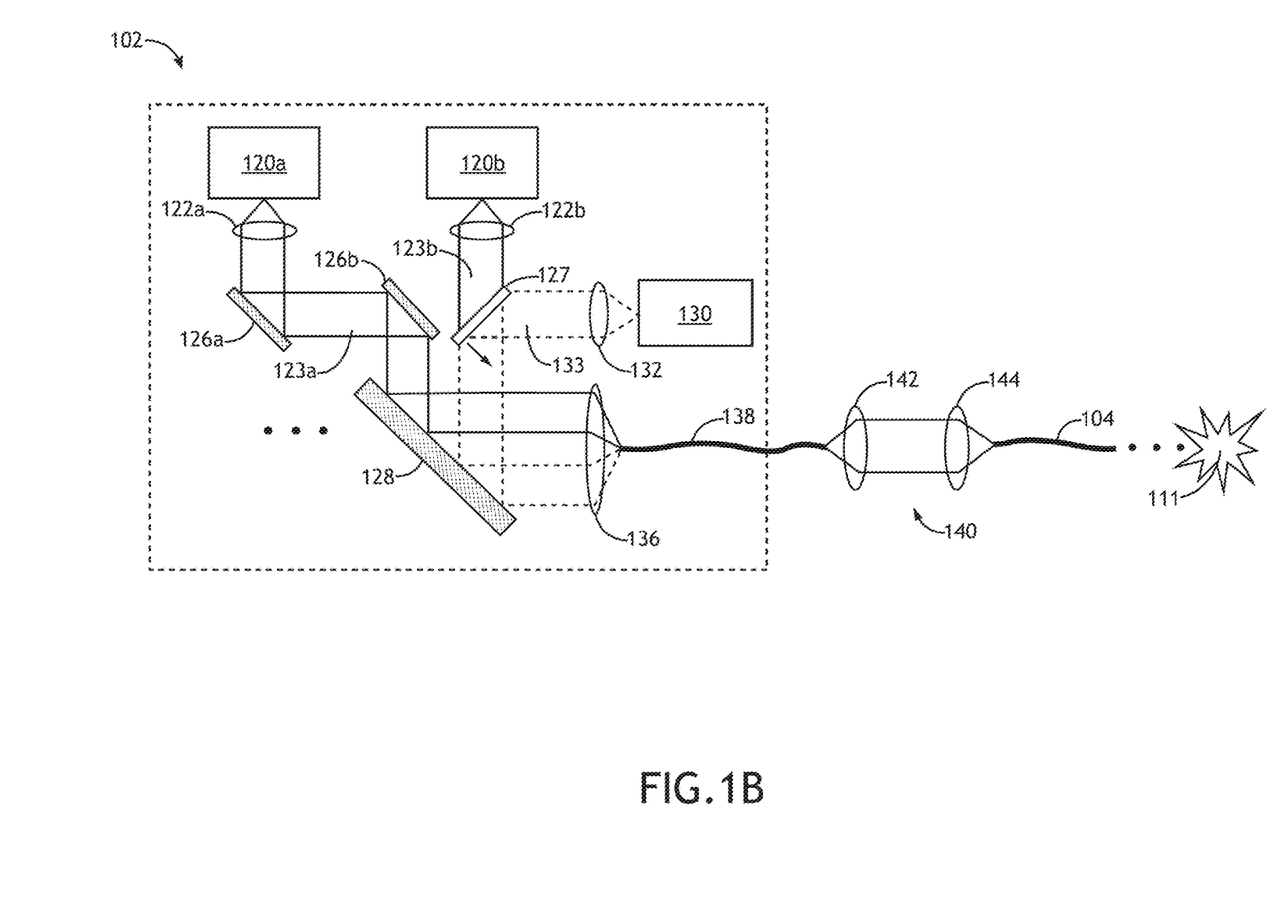
FIGS. 1B-1C illustrate simplified schematic views of an illumination source including a sustaining laser and an internal ignition laser, in accordance with one or more embodiments of the present disclosure.
Figure 1C:
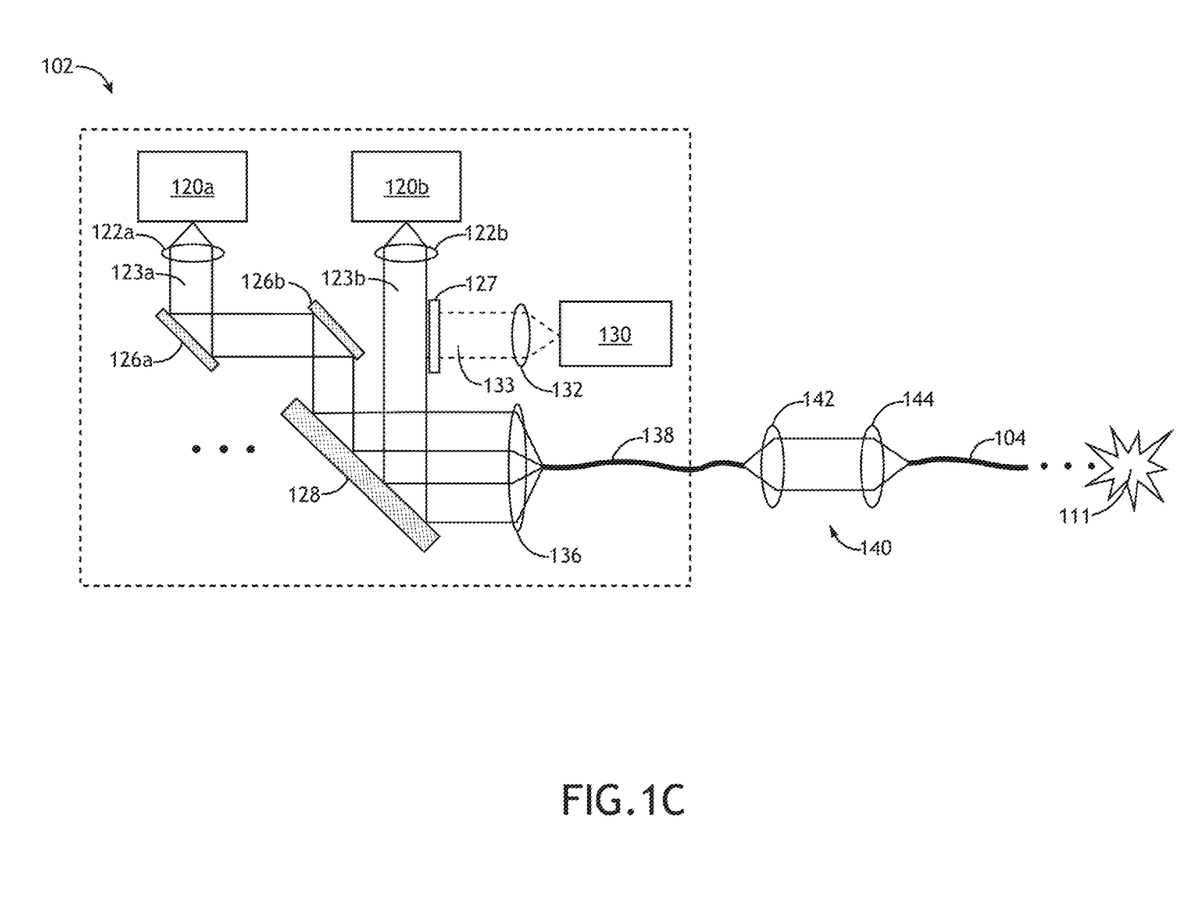

FIGS. 1B-1C illustrate an illumination source 102 equipped with one or more sustaining laser sources and one or more ignition light laser sources, in accordance with one or more embodiments of the present disclosure.

In one embodiment, the illumination source 102 includes one or more sustaining lasers 120a, 120b and one or more ignition lasers 130. In one embodiment, the one or more sustaining lasers 120a, 120b include one or more continuous wave (CW) lasers. For example, the one or more sustaining lasers 120a, 120b of laser source 102 may include, but are not limited to, one or more diode lasers (e.g., diode stacks). In another embodiment, the one or more ignition lasers 130 of laser source 102 include one or more pulsed lasers. For example, the one or more ignition lasers 130 of laser source 102 may include, but are not limited to, one or more Q-switched lasers. For instance, the one or more ignition lasers 130 of laser source 102 may include, but are not limited to, one or more Nd-YAG lasers. By way of another example, the one or more ignition lasers 130 of laser source 102 may include, but are not limited to, one or more nanosecond pulse lasers, one or more picosecond pulse lasers or one or more femtosecond pulse lasers. By way of another example, the one or more ignition lasers 130 may include one or more modulated CW lasers (i.e., CW laser operating in moderating mode). For instance, the one or more ignition lasers 130 may include one or more modulated diode lasers.

In another embodiment, the illumination source 102 includes a delivery optical fiber 138 for delivering the optical output of the illumination source (e.g., sustaining illumination and/or ignition illumination) to one or more downstream optical elements.

In another embodiment, the illumination source 102 includes a fiber coupler 140. For example, as shown in FIG. 1B, the fiber coupler 140 may optically couple an output of the delivery fiber 138 to an optical input of the process fiber 104. The fiber coupler 140 may include any number and type of optical elements necessary to couple the output of the delivery fiber 138 to the input of the process fiber 104. For example, the fiber coupler 140 may include lenses 142 and 144 arranged to couple the output of the delivery fiber 138 to the input of the process fiber 104. Further, process fiber 104 may be a sacrificial optical fiber, allowing a user to attach a new fiber to the fiber coupler 140 when necessary.

By way of example, the illumination source 102 may include a Q-switched nanosecond pulsed laser for igniting the plasma and one or more diode lasers for sustaining the plasma. In this example, the output of the Q-switched nanosecond pulsed laser may be coupled in-line with the diode laser output inside the laser source 102 itself before being coupled to the delivery fiber 138. In one embodiment, the diode lasers 120a, 120b (e.g., diode stacks) may be continuously operating in CW mode and may take over plasma sustaining responsibilities once the pulsed laser 130 has ignited the plasma. It is noted that the use of fiber lasers are typically more reliable, compact and alignment-free than other choices and may simplify the laser source design.

It is noted that any set of optical elements/components known in the art may be used to couple the output 133 of one or more ignition lasers 130 in-line with the output of the one or more sustaining lasers 120a and/or 120b to an input of the delivery optical fiber 138.

In one embodiment, a set of mirrors may be used to spatially separate the outputs of the lasers 120a, 120b and 130 and direct and/or focus the outputs of the lasers 120a, 120b and 130 to the input of the delivery fiber 138. For example, as shown in FIG. 1B, mirrors 126a, 126b, 127 and 128 are used to direct laser illumination from the sustaining lasers 120a, 120b and the ignition laser 130 to the input of the delivery fiber 138.

It is noted that since the available space is occupied by the laser illumination 123a, 123b from the sustaining lasers 120a, 120b one or more optical elements may be used to temporarily block a portion of the sustaining laser illumination in order to allow for the ignition illumination 133 to be transmitted to the delivery fiber 138 and on to the plasma. For example, as shown in FIG. 1B, a flip mirror 127 (or otherwise actuatable mirror) may be positioned so as to reflect ignition illumination 133 to mirror 128 and on to the delivery fiber 138 when the plasma is being ignited, while blocking sustaining illumination 123b from laser 120b. Then, as shown in FIG. 1C, after plasma ignition, the flip mirror 127 may be adjusted so that it blocks ignition illumination 133 from ignition source 130, while allowing sustaining illumination 123b to pass to mirror 128 and on to delivery fiber 138. It is further noted that the source 102 may include any number of lenses 122a, 122b, 132, 136 to direct and focus light into the delivery fiber 138.

It is noted that the optical output of the one or more sustaining lasers 120a, 120b and the one or more ignition lasers 130 may be coupled to the delivery fiber 138 in any manner known in the art. In another embodiment, the delivery fiber 138 and/or the process fiber 104 may be multi-step/multi-core optical fibers, whereby different wavelengths of light are focused into different layers of the given optical fiber. The use of a multi-step/multi-core optical fiber in the context of plasma generation is discussed in U.S. patent application Ser. No. 15/274,956, filed on Sep. 23, 2016, which is incorporated herein by reference in the entirety.

Figure 1D:
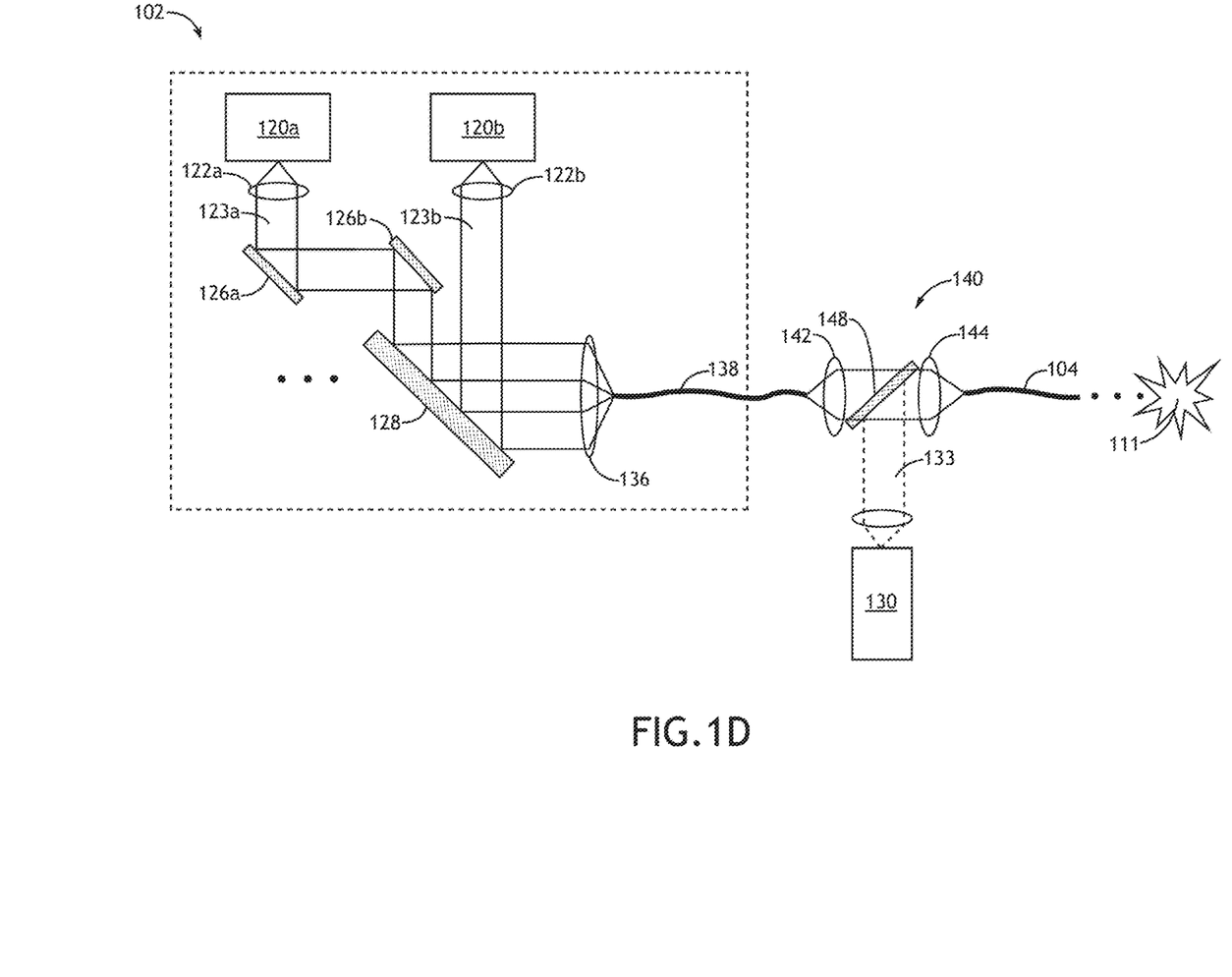
FIG. 1D illustrates a simplified schematic view of an illumination source including a sustaining laser and an external ignition laser, in accordance with one or more embodiments of the present disclosure.

FIG. 1D illustrates an illumination source 102 equipped with one or more sustaining laser sources and one or more ignition light laser sources, in accordance with one or more alternative embodiments of the present disclosure. In this embodiment, the ignition illumination 133 may be delivered to the process fiber 104 via fiber coupler 140. In one embodiment, the fiber coupler 140 includes one or more dichroic mirrors 148 suitable for reflecting the ignition illumination 133 into the process fiber 104, while allowing illumination from the sustaining lasers 120a, 120b to pass through, from the delivery fiber 138, to the process fiber 104.

In one embodiment, the dichroic mirror 148 is removable. In this regard, the dichroic mirror 148 may be selectively placed into the fiber coupler during certain applications or during plasma ignition. For instance, once the plasma 111 is ignited the dichroic mirror 148 may be removed.

This configuration allows for an output of external ignition pulsed laser 130, operating at a different wavelength than the sustaining lasers 120a, 120b, to be coupled to the process fiber 104 and the plasma 111. Such a configuration provides flexibility to scale up the pulsed laser power (pulse energy) by adding an external laser (e.g., fiber laser or conventional Nd-Yag laser).

It is noted that, while the external ignition source of FIG. 1D has been shown as the only ignition source in FIG. 1D, this configuration is not a limitation on the present disclosure. It is noted that the internal ignition source 130 of FIG. 1C and the external ignition source 130 of FIG. 1D may be used simultaneously to allow for the flexible scaling up of ignition power in applications requiring such power increases.

It is noted that the optical configuration depicted in FIGS. 1B-1D is not limited to two sustaining lasers or a single ignition laser. Rather, the optical configuration depicted in FIGS. 1B-1D may be extended to any number of sustaining lasers and any number of ignition lasers. For example, the illumination source 102 may include one or more sustaining lasers (e.g., one, two, three sustaining lasers and so on). In this example, the optical configuration of FIGS. 1B-1D may be modified by adding additional sustaining lasers. For instance, mirror 128 may be a dichroic mirror allowing for illumination from additional sustaining lasers to pass through to lens 136. By way of another example, the illumination source 102 may include one or more ignition lasers (e.g., one, two, three ignition lasers and so on).

Figure 1E:
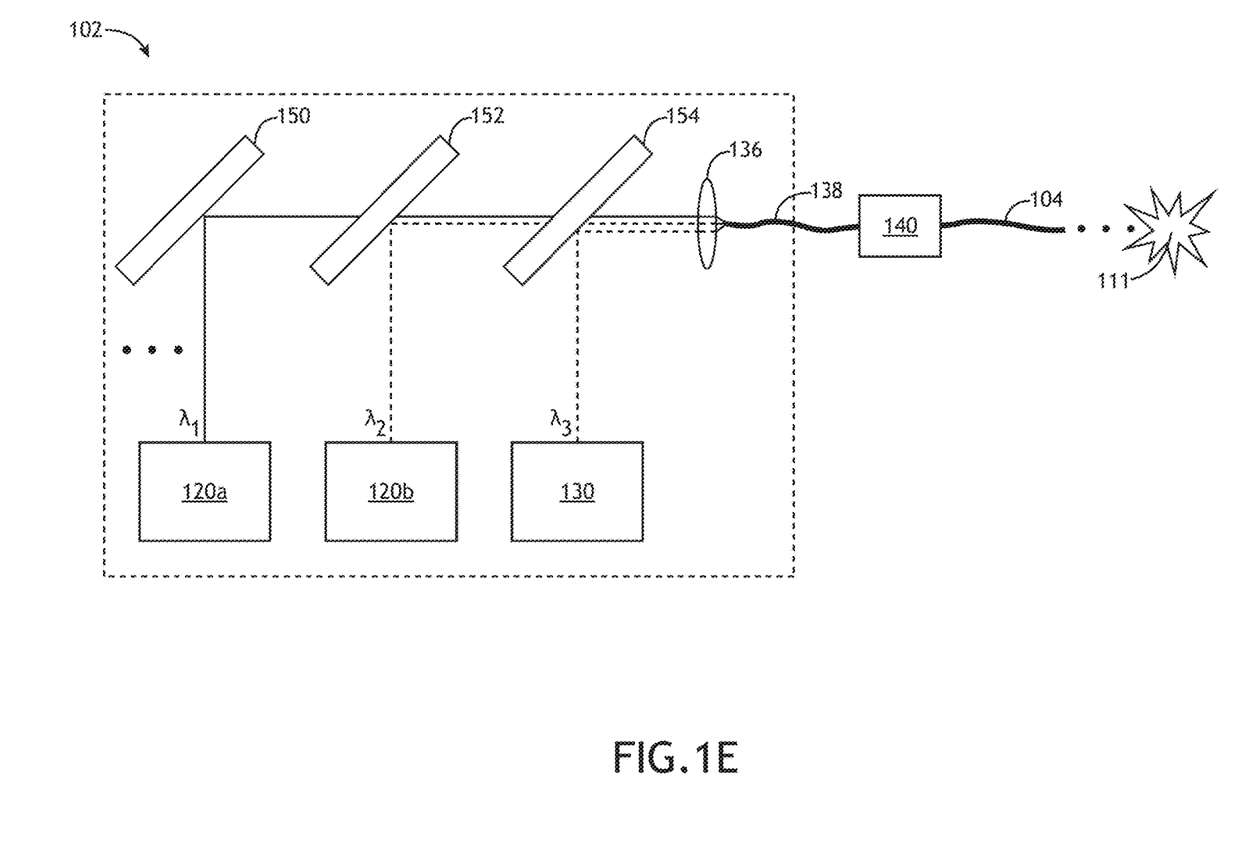
FIG. 1E illustrates a simplified schematic view of an illumination source equipped with multiple dichroic mirrors, in accordance with one or more embodiments of the present disclosure.

FIG. 1E illustrates an illumination source 102 equipped with one or more sustaining laser sources and one or more ignition light laser sources, in accordance with one or more alternative embodiments of the present disclosure. In this embodiment, the illumination source 102 includes one or more dichroic mirrors and the lasers 120a, 120b and 130 emit laser illumination of different wavelengths (or wavelength ranges). For example, the first sustaining laser 120a emits laser illumination of wavelength $\lambda_1$, the second sustaining laser 120b emits laser illumination of wavelength $\lambda_2$, and the ignition laser 130 emits laser illumination of $\lambda_3$ (where $\lambda_1$, $\lambda_2$, and $\lambda_3$ are different). Further, mirrors 150, 152 and 154 may be dichroic mirrors. In this regard, mirror 150 may reflect light of a first wavelength $\lambda_1$ (or set of wavelengths). Then, mirror 152 transmits light of the first wavelength $\lambda_1$, while reflecting light of the second wavelength $\lambda_2$. In turn, mirror 154 transmits light of the first wavelength $\lambda_1$ and second wavelength $\lambda_2$, while reflecting light of the third wavelength $\lambda_3$. In this regard, illumination from the one or more sustaining laser sources and one or more ignition light laser sources may be coupled to lens 136, which then focuses and/or directs the ignition illumination and sustaining illumination into the delivery fiber 138 (either sequentially or simultaneously). In turn, the fiber coupler 140, as discussed previously herein, may couple the output of the delivery fiber 138 into the input of the process fiber 104, which then delivers the output of the source 102 to plasma 111 (or gas) via various optical elements.

It is noted that illumination from the sustaining sources 120a, 120b and the one or more ignition sources 130 may also be combined utilizing polarization-based optical elements. For instance, a set of polarizing elements (e.g., polarization beam splitters/polarization combiners) may be used to couple illumination from one or more sustaining lasers and illumination from one or more ignition sources into the delivery fiber 138. In this regard, illumination from the one or more sustaining lasers may be polarized in one state, while the illumination from the one or more ignition lasers is polarized in an orthogonal state. Then, a set of polarization beam splitters/combiners may be implemented in a manner analogous to the dichroic mirrors of FIG. 1E.

It is noted herein that the above description of FIGS. 1B-1E is not a limitation on the scope of the present disclosure and is provided merely for purposes of illustration. It is recognized that any number of equivalent optical configurations may be implemented in order to deliver sustaining illumination and ignition illumination to the plasma 111 either sequentially or simultaneously.

Figure 1F:
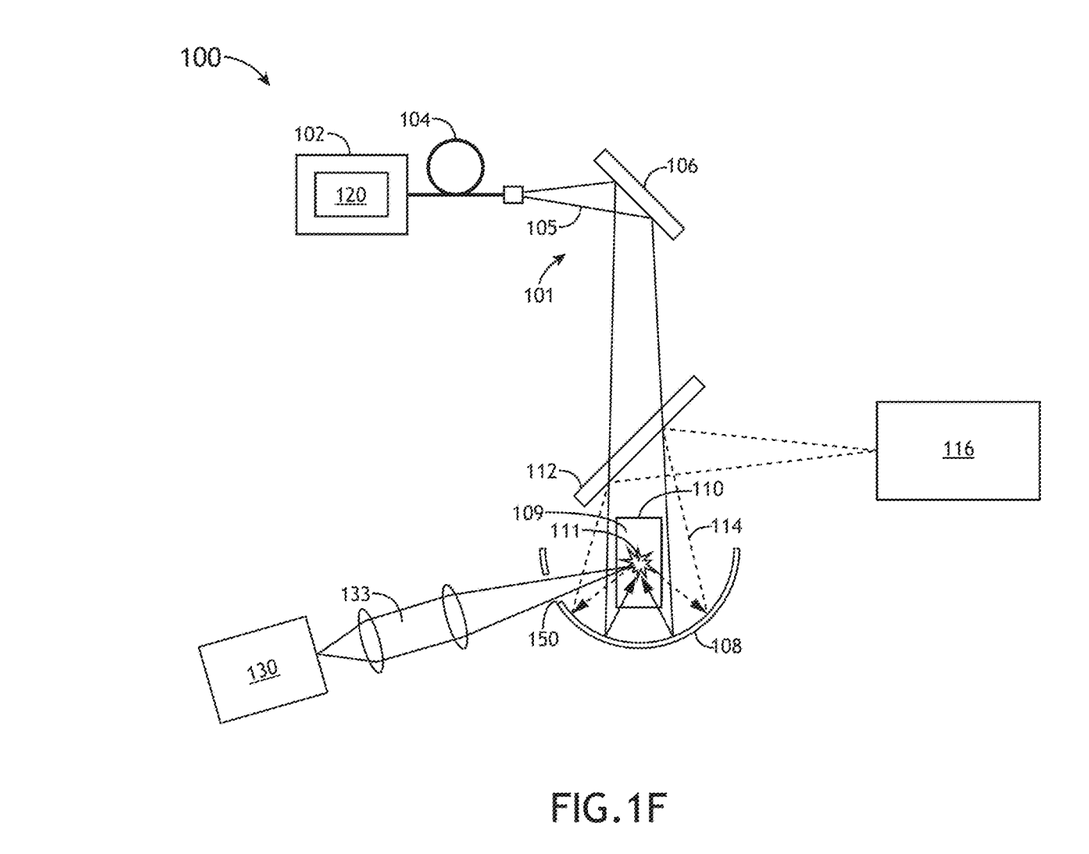
FIG. 1F illustrates a simplified schematic view of a system for forming a light-sustained plasma with an external ignition laser positioned along a direction different from the sustaining laser, in accordance with one or more embodiments of the present disclosure.

FIG. 1F illustrates system 100 for forming a light-sustained plasma (LSP), in accordance with an alternative embodiment of the present disclosure. In this embodiment, the ignition illumination may be delivered to the plasma lamp 110 via an ignition laser 130 positioned to deliver ignition illumination from a direction different from the illumination beam 105. For example, the ignition illumination 133 may be coupled into the plasma lamp 110 via a side port 150 in collection element 108. Alternatively, the ignition illumination 133 may be coupled into the plasma lamp 110 via any other direction. It is noted that an electrodeless configuration provides greater flexibility in coupling the ignition beam 133 into the plasma lamp 110. Additionally, the ignition laser beam 133 may re-use all or part of the collector element 108 common to the one or more sustaining lasers 120.

Figure 2A:
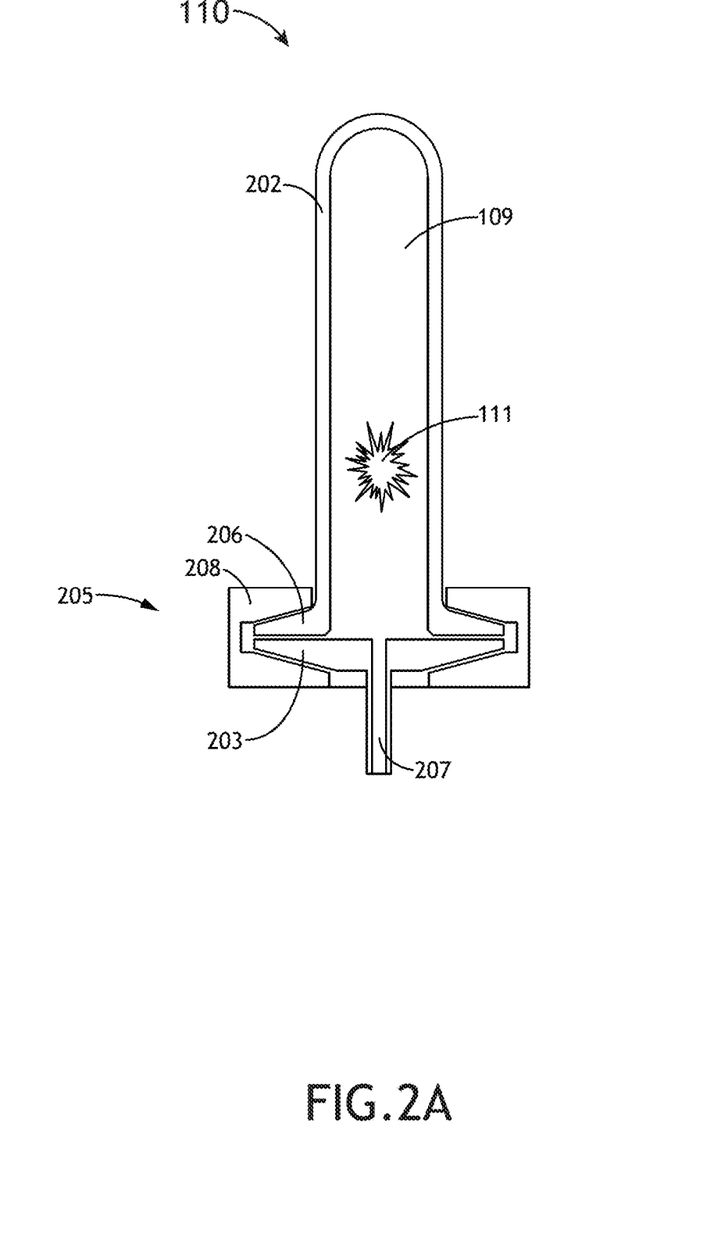
FIG. 2A illustrates a simplified schematic view of a plasma lamp having a cylindrical plasma bulb, in accordance with one or more embodiments of the present disclosure.
Figure 2B:
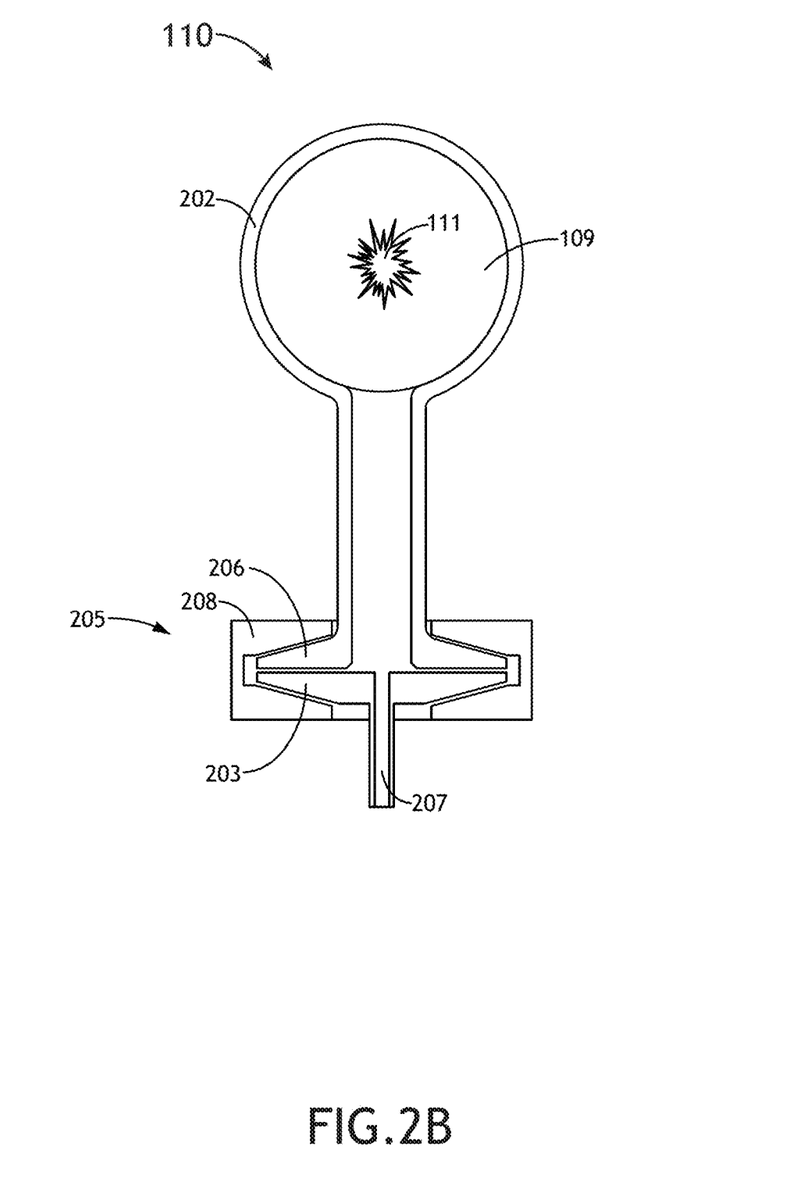
FIG. 2B illustrates a simplified schematic view of a plasma lamp having a spherical plasma bulb, in accordance with one or more embodiments of the present disclosure.
Figure 2C:
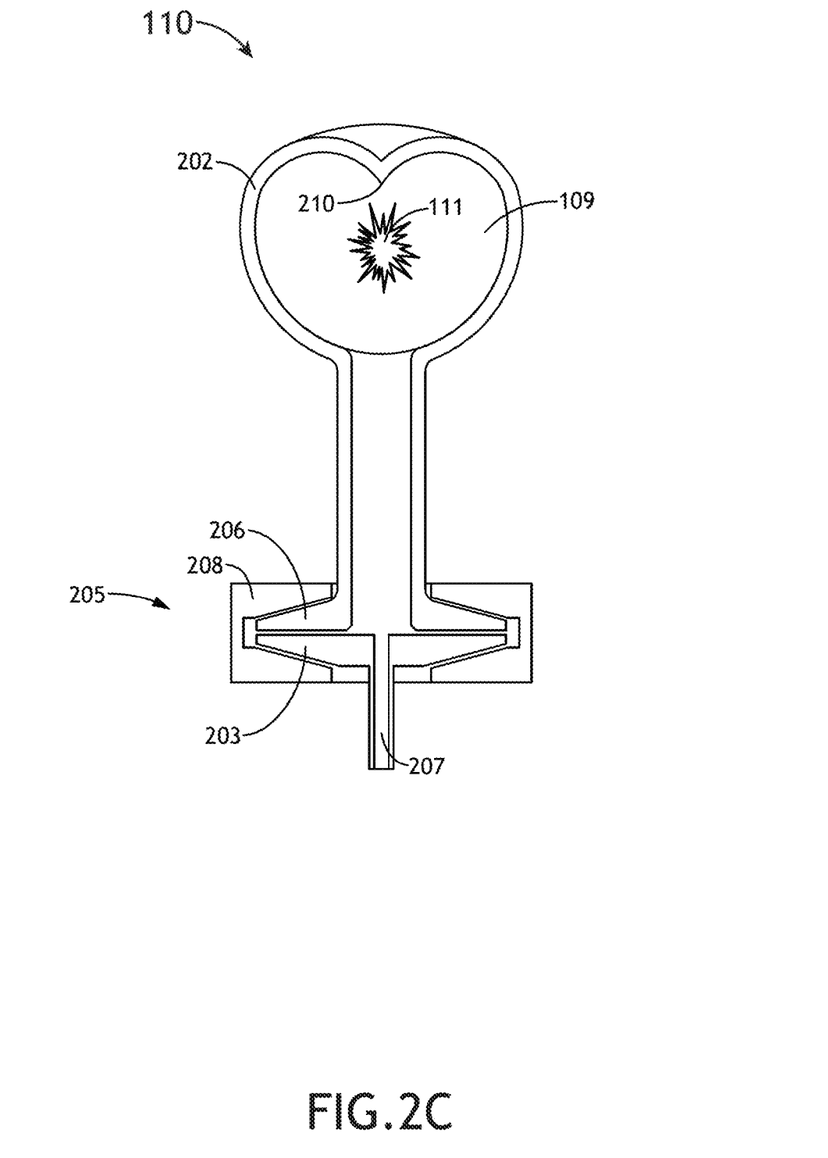
FIG. 2C illustrates a simplified schematic view of a plasma lamp having a cardioid plasma bulb, in accordance with one or more embodiments of the present disclosure.

FIGS. 2A-2C illustrate a variety of bulb shapes for use in the plasma lamp 110 of system 100, in accordance with one or more embodiments of the present disclosure. In one embodiment, as shown in FIG. 2A, the plasma bulb 202 may have a cylindrical shape. In another embodiment, the cylindrically shaped plasma bulb 202 may be extended vertically so as to aid in dissipating convection within the plasma lamp.

In another embodiment, as shown in FIG. 2B, the plasma bulb 202 may have a spherical shape. It is noted that the spherical shape of the plasma bulb 202 may reduce or eliminate the need for aberration compensation of the broadband radiation emitted by the plasma 111.

In another embodiment, as shown in FIG. 2C, the plasma bulb 202 may have a cardioid shape (i.e., heart shape). In one embodiment, the cardioid shaped plasma lamp may include a peak 210 on the internal surface of the glass bulb for directing convection within the volume of gas 109 of the plasma lamp 110.

In another embodiment, the plasma lamp 110 is refillable. As shown in FIGS. 2A-2C, the plasma lamp 110 may include a gas port assembly 205 operably coupled to a portion of the plasma bulb 202 of the plasma lamp 110. For example, the plasma lamp 110 may include a gas port assembly 205 mechanically connected to the bottom portion of the bulb 202 and configured to facilitate the selective transfer of a gas from a gas source to the internal region of the bulb 202 of the plasma lamp 110.

In one embodiment, the gas port assembly 205 may include a fill port 207, a delivery cap 203, a receiving cap 206, and a clamp 208 suitable for mechanically securing the delivery cap 203 to the receiving cap 206. In this embodiment, gas from a gas source (not shown) may be transported (i.e., flowed) from the gas source into the internal volume of the glass bulb 202 via the fill port 207 of gas port assembly 205. Further, the fill port 207, the delivery cap 203, the receiving cap 206, and the clamp 208 may each be constructed from a selected metal (e.g., stainless steel) or non-metal material.

The utilization of refillable gas bulbs and various bulb shapes is described in U.S. patent application Ser. No. 13/647,680, filed on Oct. 9, 2012, which is incorporated herein by reference in the entirety. While FIGS. 2A-2C illustrate various plasma bulb shapes implemented in the context of refillable bulbs (equipped with a gas port assembly), it is noted herein that each of the plasma bulb shapes described in the present invention may also be implemented in a non-refillable plasma lamp.

While much of the present disclosure has focused on a plasma lamp including a plasma bulb, it is noted that the scope of the present disclosure may be extended to any gas containment structure or vessel known in the art of plasma generation, such as, but not limited to, a plasma bulb, a plasma cell and a plasma chamber.

The use of a plasma bulb is described in at least U.S. patent application Ser. No. 11/695,348, filed on Apr. 2, 2007; U.S. patent application Ser. No. 11/395,523, filed on Mar. 31, 2006; and U.S. patent application Ser. No. 13/647,680, filed on Oct. 9, 2012, which are each incorporated previously herein by reference in the entirety. The use of a plasma cell is described in at least U.S. patent application Ser. No. 14/231,196, filed on Mar. 31, 2014; and U.S. patent application Ser. No. 14/288,092, filed on May 27, 2014, which are each incorporated previously herein by reference in the entirety. The use of a gas chamber as a gas containment structure is described in U.S. patent application Ser. No. 12/787,827, filed May 26, 2010; U.S. patent application Ser. No. 14/660,849, filed Mar. 17, 2015; U.S. patent application Ser. No. 14/670,210, filed Mar. 26, 2015; U.S. patent application Ser. No. 14/224,945, filed Mar. 25, 2014, which are each incorporated herein by reference in the entirety.

Referring again to FIG. 1A, the transmitting portion of the plasma lamp 110 of system 100 (e.g., bulb, transmission element or window) may be formed from any material known in the art that is at least partially transparent to the broadband radiation 114 generated by plasma 111 and/or the illumination 105 from the illumination source 102. For example, one or more transmitting portions (e.g., bulb, transmission element or window) of the plasma lamp 110 may be formed from any material known in the art that is at least partially transparent to EUV radiation, VUV radiation, DUV radiation, UV radiation, NUV radiation and/or visible light generated within the plasma lamp 110. Further, one or more transmitting portions of the plasma lamp 110 may be formed from any material known in the art that is at least partially transparent to IR radiation, visible light and/or UV light from the illumination source 102. In another embodiment, one or more transmitting portions of the plasma lamp 110 may be formed from any material known in the art transparent to both radiation from the illumination source 102 (e.g., IR source) and radiation (e.g., EUV, VUV, DUV, UV, NUV radiation and/or visible light) emitted by the plasma 111.

In some embodiments, the transmitting portion(s) of the plasma lamp 110 may be formed from a low-OH content fused silica glass material. In other embodiments, the transmitting portion(s) of the gas containment structure may be formed from high-OH content fused silica glass material. For example, the transmitting portion(s) of the plasma lamp 110 may include, but is not limited to, SUPRASIL 1, SUPRASIL 2, SUPRASIL 300, SUPRASIL 310, HERALUX PLUS, HERALUX-VUV, and the like. In other embodiments, the transmitting portion(s) of the plasma lamp 110 may include, but is not limited to, calcium fluoride, magnesium fluoride, lithium fluoride, crystalline quartz and sapphire. Various glasses suitable for implementation in the plasma lamp 110 of the present disclosure are discussed in detail in A. Schreiber et al., *Radiation Resistance of Quartz Glass for VUV Discharge Lamps*, J. Phys. D: Appl. Phys. 38 (2005), 3242-3250, which is incorporated herein by reference in the entirety.

In one embodiment, the plasma lamp 110 may contain any selected gas (e.g., argon, xenon, mercury or the like) known in the art suitable for generating plasma upon absorption of pump illumination. In one embodiment, the focusing of illumination 105 from the illumination source 102 into the volume of gas 109 causes energy to be absorbed by the gas or plasma (e.g., through one or more selected absorption lines) within the plasma lamp 110.

It is contemplated herein that the system 100 may be utilized to initiate and/or sustain plasma 111 in a variety of gas environments. In one embodiment, the gas used to initiate and/or sustain plasma 111 may include an inert gas (e.g., noble gas or non-noble gas) or a non-inert gas (e.g., mercury). In another embodiment, the gas used to initiate and/or sustain plasma 111 may include a mixture of gases (e.g., mixture of inert gases, mixture of inert gas with non-inert gas or a mixture of non-inert gases). For example, gases suitable for implementation in system 100 of the present disclosure may include, but are not limited to, Xe, Ar, Ne, Kr, He, $N_2$, $H_2O$, $O_2$, $H_2$, $D_2$, $F_2$, $CH_4$, one or more metal halides, a halogen, Hg, Cd, Zn, Sn, Ga, Fe, Li, Na, Ar:Xe, ArHg, KrHg, XeHg, and any mixture thereof. The present disclosure should be interpreted to extend to any light pumped plasma generating system and should further be interpreted to extend to any type of gas suitable for sustaining plasma within a gas containment structure.

It is noted that the broadband output 114 of the plasma lamp 110 may be coupled to the illumination optics of an optical characterization tool, such as, but not limited to, an inspection tool and/or metrology tool.

In one embodiment, system 100 may include various additional optical elements. In one embodiment, the set of additional optics may include additional collection optics configured to collect broadband radiation 114 emanating from the plasma 111. For instance, the system 100 may include a cold mirror 112 arranged to direct illumination from the collector element 108 to downstream optics, such as, but not limited to, a homogenizer.

In another embodiment, the additional set of optics may include one or more additional lenses (e.g., lens) placed along either the illumination pathway or the collection pathway of system 100. The one or more lenses may be utilized to focus illumination from the illumination source 102 into the volume of gas 109. Alternatively, the one or more additional lenses may be utilized to focus broadband radiation 114 emanating from the plasma 111 onto a selected target (not shown).

In another embodiment, the additional set of optics may include a turning mirror 106. In one embodiment, the turning mirror 106 may be arranged to receive illumination 105 from the illumination source 102 and direct the illumination to the volume of gas 109 contained within the plasma lamp 110 via collection element 108. In another embodiment, the collection element 108 is arranged to receive illumination from mirror 106 and focus the illumination to the focal point of the collection element 108 (e.g., ellipsoid-shaped collection element), where the plasma lamp 110 is located.

In another embodiment, the additional set of optics may include one or more filters (not shown) placed along either the illumination pathway or the collection pathway in order to filter illumination prior to light entering the plasma lamp 110 or to filter illumination following emission of the light from the plasma 111. It is noted herein that the set of optics of system 100 as described above and illustrated in FIG. 1A are provided merely for illustration and should not be interpreted as limiting. It is anticipated that a number of equivalent optical configurations may be utilized within the scope of the present invention.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected", or "coupled", to each other to achieve the desired functionality, and any two components capable of being so associated can also be viewed as being "couplable", to each other to achieve the desired functionality. Specific examples of couplable include but are not limited to physically mateable and/or physically interacting components and/or wirelessly interactable and/or wirelessly interacting components and/or logically interacting and/or logically interactable components.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. An illumination source for electrodeless plasma ignition comprising:
   one or more pulsed ignition lasers configured to ignite a plasma within a gas contained within a plasma lamp;
   one or more continuous-wave sustaining lasers configured to sustain the plasma;
   a delivery optical fiber; and
   one or more optical elements configured to selectively optically couple an output of the one or more pulsed ignition lasers and an output of the one or more continuous-wave sustaining lasers to the delivery optical fiber, wherein the output of the one or more ignition lasers is coupled in-line with the output of the one or more continuous-wave sustaining lasers prior to an input of the delivery optical fiber.

2. The illumination source of claim 1, wherein the one or more continuous-wave sustaining lasers comprise:
   one or more diode lasers.

3. The illumination source of claim 1, wherein the one or more optical elements configured to selectively optically couple an output of the one or more ignition lasers in-line and an output of the one or more continuous-wave sustaining lasers to the delivery optical fiber comprise:
   at least one of one or more dichroic mirrors, one or more polarizing combiners, one or more blocking mirrors or one or more flip mirrors.

4. An illumination source for electrodeless plasma ignition comprising:
   one or more pulsed ignition lasers configured to ignite a plasma within a gas contained within a plasma lamp;
   one or more continuous-wave sustaining lasers configured to sustain the plasma;
   a delivery optical fiber, wherein an output of the one or more continuous-wave sustaining lasers is coupled to an input of the delivery fiber;
   a process optical fiber; and
   a fiber coupler optically coupled to an output of the delivery optical fiber and an input of the process optical fiber, wherein the fiber coupler includes one or more dichroic mirrors configured to selectively optically couple an output of the one or more pulsed ignition lasers and an output of the one or more continuous-wave sustaining lasers, from the delivery optical fiber, to an input of the process optical fiber.

5. The illumination source of claim 4, wherein the one or more dichroic mirrors of the fiber coupler are configured to couple an output of the delivery optical fiber and the one or more pulsed ignition lasers to an input of the process optical fiber.

6. The illumination source of claim 4, wherein the output of the one or more pulsed ignition lasers is coupled in-line with the output of the one or more continuous-wave sustaining lasers downstream of an output of the delivery optical fiber.

7. The illumination source of claim 4, wherein the one or more continuous-wave sustaining lasers comprise:
   one or more diode lasers.

8. A plasma broadband source comprising:
   a plasma lamp for containing a volume of gas,
   one or more pulsed ignition lasers;
   one or more continuous-wave sustaining lasers;
   a delivery optical fiber;
   one or more optical elements configured to selectively optically couple an output of the one or more pulsed ignition lasers and an output of the one or more continuous-wave sustaining lasers to the delivery optical fiber, wherein the output of the one or more ignition lasers is coupled in-line with the output of the one or more continuous-wave sustaining lasers prior to an input of the delivery optical fiber; and
   one or more lamp optics configured to direct an output from the delivery optical fiber to the volume of gas within the plasma lamp to ignite and sustain the plasma within the volume of gas in the plasma lamp.

9. The plasma broadband source of claim 8, wherein the one or more continuous-wave sustaining lasers comprise:
   one or more diode lasers.

10. The plasma broadband source of claim 8, wherein the one or more optical elements configured to selectively optically couple an output of the one or more pulsed ignition lasers and an output of the one or more continuous-wave sustaining lasers to the delivery optical fiber comprise:
    at least one of one or more dichroic mirrors, one or more polarizing combiners, one or more blocking mirrors or one or more flip mirrors.

11. The plasma broadband source of claim 10, wherein the one or more lamp optics are configured to collect at least a portion of broadband radiation emitted by the generated plasma and direct the broadband radiation to one or more additional optical elements.

12. The plasma broadband source of claim 8, wherein the one or more lamp optics comprise:
    a collector element.

13. The plasma broadband source of claim 12, wherein the collector element comprises:
    at least one of an ellipsoidal collector mirror, a parabolic collector mirror or a spherical collector mirror.

14. The plasma broadband source of claim 8, wherein the one or more lamp optics comprise:
    a set of reflector elements configured to direct an output from the delivery optical fiber to the volume of gas within the plasma lamp; and a set of collector elements configured to collect at least a portion of broadband radiation emitted by the generated plasma and direct the broadband radiation to one or more additional optical elements.

15. The plasma broadband source of claim 8, wherein the plasma lamp includes a plasma bulb.

16. The plasma broadband source of claim 15, wherein the plasma bulb has at least one of a substantially cylindrical shape or a substantially spherical shape.

17. The plasma broadband source of claim 15, wherein the plasma bulb has a substantially cardioid shape.

18. The plasma broadband source of claim 17, wherein the plasma bulb has a peak disposed on an internal surface of the bulb configured to direct convection within the plasma bulb.

19. The plasma broadband source of claim 8, wherein the plasma lamp is electrodeless.

20. The plasma broadband source of claim 8, wherein the gas of the plasma bulb comprises:
    at least one of an inert gas, a non-inert gas or a mixture of two or more gases.

21. A plasma broadband source comprising:
    a plasma lamp for containing a volume of gas,
    one or more pulsed ignition lasers;
    one or more continuous-wave sustaining lasers;
    a delivery optical fiber, wherein an output of the one or more continuous-wave sustaining lasers is coupled to an input of the delivery fiber;
    a process optical fiber;
    a fiber coupler optically coupled to an output of the delivery optical fiber and an input of the process optical fiber, wherein the fiber coupler includes one or more dichroic mirrors configured to selectively optically couple an output of the one or more pulsed ignition lasers and an output of the one or more continuous-wave sustaining lasers to an input of the process optical fiber; and
    one or more lamp optics configured to direct an output from the process optical fiber to the volume of gas within the plasma lamp to ignite and sustain the plasma within the volume of gas in the plasma lamp.

22. The plasma broadband source of claim 21, wherein the one or more dichroic mirrors of the fiber coupler are configured to couple an output of the delivery optical fiber and the one or more pulsed ignition lasers to an input of the process optical fiber.

23. The plasma broadband source of claim 21, wherein the output of the one or more pulsed ignition lasers is coupled in-line with the output of the one or more continuous-wave sustaining lasers downstream of an output of the delivery optical fiber.

24. The plasma broadband source of claim 21, wherein the one or more continuous-wave sustaining lasers comprise:
    one or more diode lasers.

25. The plasma broadband source of claim 21, wherein the one or more lamp optics are configured to collect at least a portion of broadband radiation emitted by the generated plasma and direct the broadband radiation to one or more additional optical elements.

26. The plasma broadband source of claim 21, wherein the one or more lamp optics comprise:
    a collector element.

27. The plasma broadband source of claim 26, wherein the collector element comprises:
    at least one of an ellipsoidal collector mirror, a parabolic collector mirror or a spherical collector mirror.

28. The plasma broadband source of claim 21, wherein the one or more lamp optics comprise:
    a set of reflector elements configured to direct an output from the delivery optical fiber to the volume of gas within the plasma lamp; and
    a set of collector elements configured to collect at least a portion of broadband radiation emitted by the generated plasma and direct the broadband radiation to one or more additional optical elements.

29. The plasma broadband source of claim 21, wherein the plasma lamp includes a plasma bulb.

30. The plasma broadband source of claim 29, wherein the plasma bulb has at least one of a substantially cylindrical shape or a substantially spherical shape.

31. The plasma broadband source of claim 29, wherein the plasma bulb has a substantially cardioid shape.

32. The plasma broadband source of claim 31, wherein the plasma bulb has a peak disposed on an internal surface of the bulb configured to direct convection within the plasma bulb.

33. The plasma broadband source of claim 21, wherein the plasma lamp is electrodeless.

34. The plasma broadband source of claim 21, wherein the gas of the plasma bulb comprises:
    at least one of an inert gas, a non-inert gas or a mixture of two or more gases.

* * * * *